United States Patent
Town et al.

(10) Patent No.: US 8,623,486 B2
(45) Date of Patent: ***Jan. 7, 2014

(54) HYBRID DISC, METHOD AND SYSTEM OF FORMING THE DISC

(75) Inventors: John Matthew Town, Ojai, CA (US); Patrick J. Byrne, Ojai, CA (US); Alan Bruce Hamersley, Newbury Park, CA (US)

(73) Assignee: Thomson Licensing, Issy les Moulineaux (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/379,787

(22) PCT Filed: Dec. 3, 2009

(86) PCT No.: PCT/US2009/006370
§ 371 (c)(1),
(2), (4) Date: Dec. 21, 2011

(87) PCT Pub. No.: WO2010/151243
PCT Pub. Date: Dec. 29, 2010

(65) Prior Publication Data
US 2012/0094054 A1 Apr. 19, 2012

Related U.S. Application Data

(60) Provisional application No. 61/269,342, filed on Jun. 23, 2009.

(51) Int. Cl.
*G11B 7/24* (2013.01)
(52) U.S. Cl.
USPC ............... 428/64.1; 428/64.4; 430/270.11

(58) Field of Classification Search
USPC ................... 428/64.4; 430/270.11
See application file for complete search history.

(56) References Cited

U.S. PATENT DOCUMENTS

| 5,568,466 | A | 10/1996 | Komaki et al. |
| 5,827,593 | A | 10/1998 | Maruyama et al. |
| 6,657,948 | B1 | 12/2003 | Tajima et al. |
| 7,007,290 | B2 | 2/2006 | Wilcoxson et al. |

(Continued)

FOREIGN PATENT DOCUMENTS

| EP | 1752980 | 2/2007 |
| JP | 7201083 | 8/1995 |

(Continued)

OTHER PUBLICATIONS

Article entitled "Singulus Molding"—Smart Solutions to Drive the Future, six pages.

(Continued)

*Primary Examiner* — Elizabeth Mulvaney
(74) *Attorney, Agent, or Firm* — Robert D. Shedd; Wan Yee Cheung

(57) ABSTRACT

A hybrid data disc, method and system of forming the disc are disclosed. The hybrid disc includes a first substrate structure bonded to a second substrate structure, and at least two data layers of different formats for access from different sides of the disc. One example provides the second substrate structure with a second substrate that has at least one curable material layer on each side of the second substrate, and the curable material has a property that results in shrinkage associated with curing of the material. Other examples provide a data disc with different stacking ring configurations, a thinner substrate and substrate structures of opposite curvature.

31 Claims, 8 Drawing Sheets

(56) References Cited

U.S. PATENT DOCUMENTS

| | | |
|---|---|---|
| 7,214,052 B2 | 5/2007 | Gabriel |
| 7,383,560 B2 | 6/2008 | Edwards |
| 7,684,309 B2 | 3/2010 | Mueller |
| 2002/0025402 A1 | 2/2002 | Tronche et al. |
| 2002/0141329 A1 | 10/2002 | Tajima et al. |
| 2003/0145941 A1 | 8/2003 | Hanzawa |
| 2004/0002018 A1 | 1/2004 | Oishi et al. |
| 2004/0013976 A1 | 1/2004 | Fujimoto et al. |
| 2004/0081070 A1 | 4/2004 | Correa |
| 2004/0170119 A1 | 9/2004 | Watanabe |
| 2004/0205807 A1 | 10/2004 | Wilcoxson et al. |
| 2005/0205205 A1 | 9/2005 | Kratzer et al. |
| 2006/0136947 A1 | 6/2006 | LeBlanc et al. |
| 2006/0166140 A1 | 7/2006 | Fujimoto et al. |
| 2006/0167200 A1 | 7/2006 | Fujimoto et al. |
| 2006/0184958 A1 | 8/2006 | Garcia |
| 2006/0280110 A1 | 12/2006 | Katoh et al. |
| 2007/0059479 A1 | 3/2007 | Oguni |
| 2007/0076576 A1 | 4/2007 | Schreiber |
| 2007/0105048 A1 | 5/2007 | Hiroki |
| 2008/0107010 A1 | 5/2008 | Town |
| 2008/0219111 A1 | 9/2008 | Rompacy et al. |
| 2008/0318170 A1 | 12/2008 | Lin et al. |
| 2009/0144763 A1 | 6/2009 | Hurst et al. |
| 2009/0148651 A1 | 6/2009 | Tokuda et al. |
| 2009/0207723 A1 | 8/2009 | Ito |

FOREIGN PATENT DOCUMENTS

| | | |
|---|---|---|
| JP | 2002251784 | 9/2002 |
| WO | WO9838637 | 9/1998 |
| WO | WO9962060 | 12/1999 |
| WO | WO2006036016 | 4/2006 |
| WO | WO2006071809 | 7/2006 |

OTHER PUBLICATIONS

Article entitled "Blueline II BD 50", Enabling the Blu-Ray Future, eight pages.

Sarch Report dated Jun. 29, 2010.

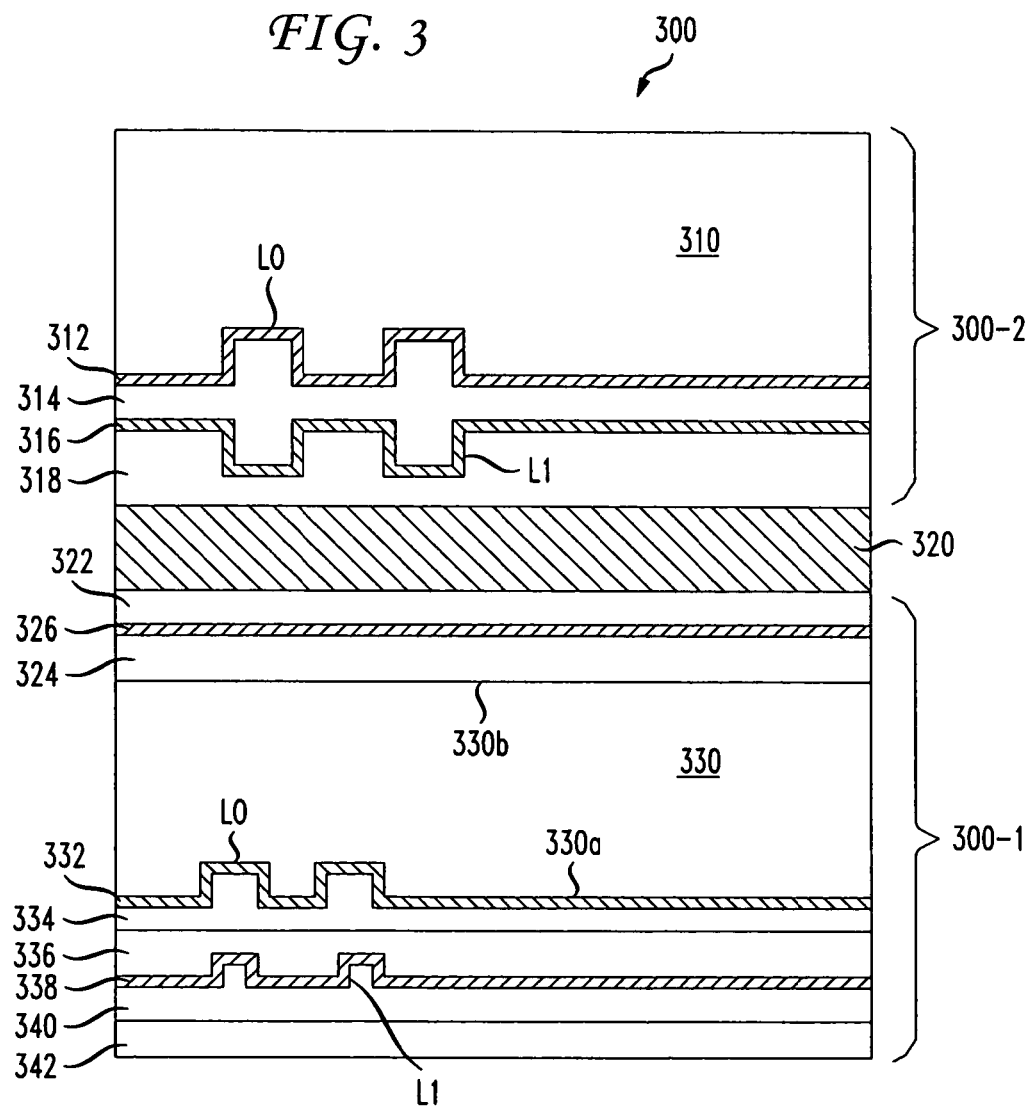

HYBRID DISC, METHOD AND SYSTEM OF FORMING THE DISC

CROSS-REFERENCE TO RELATED APPLICATIONS

This application claims the benefit, under 35 U.S.C. §365 of International Application PCT/US2009/006370, filed Dec. 3, 2009, which was published in accordance with PCT Article 21(2) on Dec. 29, 2010 in English and which claims the benefit of U.S. provisional patent application No. 61/269,342, filed Jun. 23, 2009.

TECHNICAL FIELD

This invention relates to a data disc having data in at least two different formats, and method and system for forming the disc.

BACKGROUND

With the development and availability of different data formats for multimedia content, it is often desirable to have contents in different data formats on a single data disc. To manufacture these hybrid discs, it is necessary to modify conventional fabrication processes and/or systems typically used for single format discs.

To facilitate understanding of the embodiments of the present invention, some background relating to a conventional optical disc and its manufacturing process is provided in FIG. 1 and FIG. 2a-d, respectively.

FIG. 1 is a schematic illustration of a conventional dual layer optical disc. The optical disc 100 has a substrate 102, a first reflective layer 104, a spacer or bonding layer 106, a second reflective layer 108, and a layer 110. For a Blu-ray disc (BD), layer 110 is a cover layer, and for a digital versatile disc (DVD), layer 110 is a second substrate. For a BD, the substrate 102 is typically a 1.1 mm polycarbonate disc, and the first reflective layer 104, which is highly or substantially totally reflective at the read-out wavelength, can be made of a silver alloy or aluminum with a thickness of less than about 50 nm. The second reflective layer 108, which is partially reflective, can be made of a silver alloy with a thickness of less than about 20 nm. The Blu-ray spacer layer 106 is made of a transparent resin material and has a thickness of about 25 μm, and the cover layer is made of a transparent material with a thickness of about 75 μm, and may also include a protective hard coating.

Presently, there are two widely used methods for manufacturing dual-layer Blu-ray optical discs. One is a plastic stamper method, and the other is a "wet embossing" method. The plastic stamper method is also referred to as a "2P" process, which stands for photo polymerization (referring to one of the steps in the method). The method involves molding a first data layer in a first substrate, and a second data layer in a second substrate. After a reflective layer is formed over the first data layer, the two substrates are bonded to each other using an adhesive. The second substrate is then separated and discarded, leaving an impression of the second data layer molded into the adhesive layer remaining on the first substrate. Additional processing steps are performed to complete the fabrication of the disc. In the case of Blu-ray discs, the first substrate is a 1.1 mm disc, and the second substrate may be a 0.6 mm disc.

The 2P method is further illustrated with reference to FIGS. 2a-d, which depict cross-sectional views showing various stages during the fabrication of an optical disc, e.g., a Blu-ray disc. FIG. 2a shows a first substrate 202, e.g., a 1.1 mm thick polycarbonate disc, with a surface 202D having structures such as pits and lands representing data in a first data layer. A first reflective layer 204 is formed over the molded surface 202D of the substrate 202. A different substrate 250, e.g., a polycarbonate disc, typically with a thickness of 0.6 mm, has a surface 250D with pits and lands representing data in a second data layer. Surfaces 202D and 250D are molded using respective stampers (not shown).

The substrate 250 is bonded to the reflective layer 204 with an adhesive layer 206 (which may be made of two separate layers of different adhesive materials), as shown in FIG. 2b. After curing the adhesive by exposure to ultra-violet (UV) light (through photo polymerization of the adhesive), the substrate 250 is mechanically stripped from the reflective layer 204, leaving the data layer impression on a surface 206D of the adhesive layer 206, as shown in FIG. 2c. Since the substrate 250 is discarded after this fabrication, and effectively serves as a stamper for transferring the data layer onto the adhesive 206, it is also referred to as a sacrificial plastic stamper.

The substrate structure in FIG. 2c has two data layers—one molded on the substrate 202 and the other on adhesive layer 206. A reflective layer 208 is then formed over the data surface 206D of the adhesive layer 206, e.g., by sputtering, and a cover layer 210 is applied over the reflective layer 208, resulting in an optical disc 200, as shown in FIG. 2d.

Another conventional method for making discs is the "wet embossing" method, which starts by molding the first data layer in the 1.1 mm Blu-ray disc polycarbonate substrate 202 as shown in FIG. 2a. After applying the first reflective layer 204, one or two layers of lacquer (not shown), including a wet embossing lacquer, are applied over the reflective layer 204. The second data layer is embossed in the wet lacquer using a re-usable nickel stamper and the lacquer is UV-cured on the stamper. The disc structure is subsequently removed from the stamper, and fabrication is completed by performing additional steps such as those described above in connection with FIG. 2c-d.

SUMMARY OF INVENTION

Embodiments of the present invention provide a hybrid disc, a method and a system for forming the disc.

One embodiment provides a data disc, which includes a first substrate structure bonded to a second substrate structure. The first substrate structure has a first substrate and at least a first data layer for access from a first side of the disc, and the second substrate structure has a second substrate and at least a second data layer for access from a second side of the disc, with the first and second data layers having different data formats. The second substrate structure also includes a first curable material layer disposed over a first side of the second substrate, and a second curable material layer disposed over a second side of the second substrate, and the first and second curable materials each has a property that results in shrinkage associated with curing of the material.

Another embodiment provides a method for forming a data disc, which includes forming a first substrate structure having at least a first data layer for access from a first side of the disc, forming a second substrate structure having at least a second data layer for access from a second side of the disc, where the first data layer and the second data layer have different data formats. The method also includes depositing at least a first curable material layer over a first side of a second substrate of the second substrate structure and curing the deposited first material, and depositing at least a second curable material layer over a second side of the second substrate and curing the deposited second material, where the first curable material has a property that results in a first amount of shrinkage associated with curing of the material, and the second curable material has a property that results in a second amount of shrinkage associated with curing of the material, and bonding the first substrate structure to the second substrate structure.

Another embodiment provides a data disc, which includes a first substrate structure bonded to a second substrate structure. The first substrate structure has a first substrate and at least a first data layer in a first format for access from a first side of the disc, and the second substrate structure has a second substrate and at least a second data layer in a second format for access from a second side of the disc, with the second format being different from the first data format, and the disc has a single annular protruded portion formed on a thinner one of the first and second substrates.

Another embodiment provides a method of forming a data disc, which includes providing a first substrate structure having a first substrate and at least a first data layer in a first format for access from a first side of the disc, providing a second substrate structure having a second substrate thinner than the first substrate and at least a second data layer in a second format for access from a second side of the disc, with the second format being different from the first format, and bonding the first substrate structure to the second substrate structure. A single annular protruded portion is provided on the disc, and is formed by injection molding of the second substrate.

Another embodiment provides a system for use in forming a data disc, the system includes a first sub-system configured for forming a first substrate structure having a first substrate and at least a first data layer having a first data format for access from a first side of the disc, the first sub-system being configured for forming the first substrate structure without any annular protruded portion. The system also includes a second sub-system configured for forming a second substrate structure having a second substrate and at least a second data layer having a second data format for access from a second side of the disc, with the second data format being different from the first data format, and the second sub-system being configured for forming an annular protruded portion by injection molding of the second substrate. The system further includes a third sub-system configured for bonding the first substrate structure to the second substrate structure to form the data disc.

BRIEF DESCRIPTION OF THE DRAWINGS

The teachings of the present invention can be readily understood by considering the following detailed description in conjunction with the accompanying drawings, in which:

FIG. 3 illustrates a layer structure of a hybrid disc in accordance with one embodiment of the present principles;

To facilitate understanding, identical reference numerals have been used, where possible, to designate identical elements that are common to the figures. The drawings are not to scale, and one or more features may be expanded or reduced for clarity.

DETAILED DESCRIPTION

Figure 1:
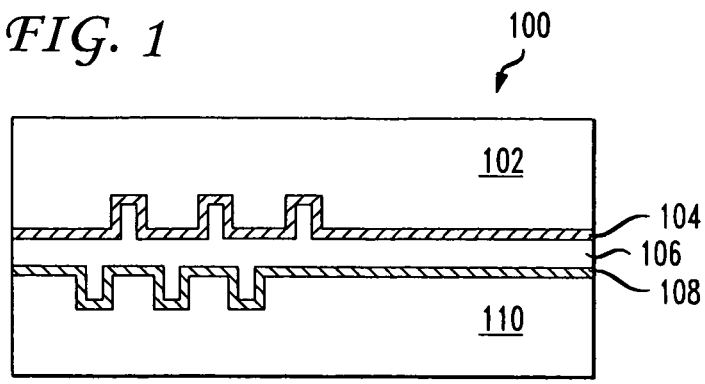
FIG. 1 illustrates a structure of a conventional dual-layer disc.
Figure 2A:
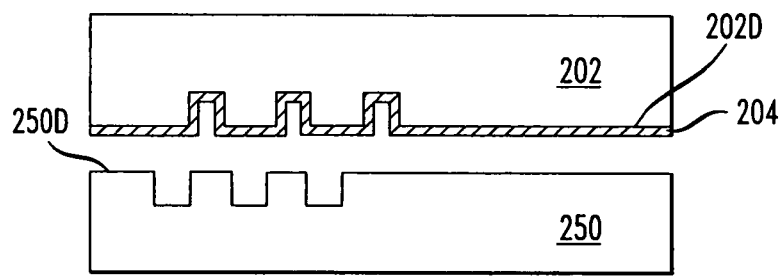
FIGS. 2a-d are cross-sectional views illustrating a process suitable for forming the dual-layer disc of FIG. 1.
Figure 2B:
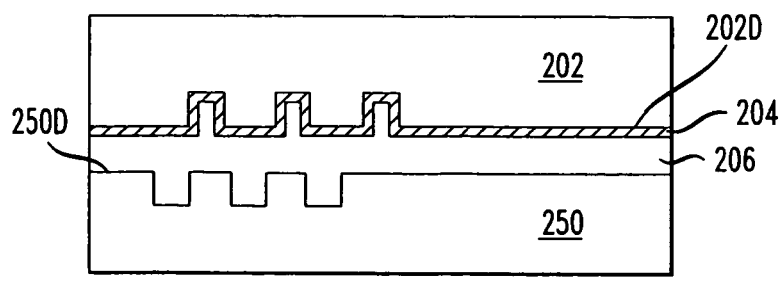
Figure 2C:
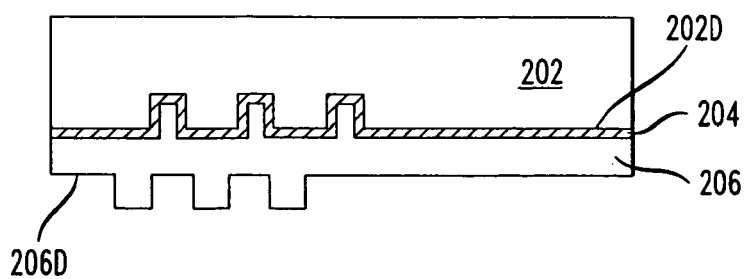
Figure 2D:
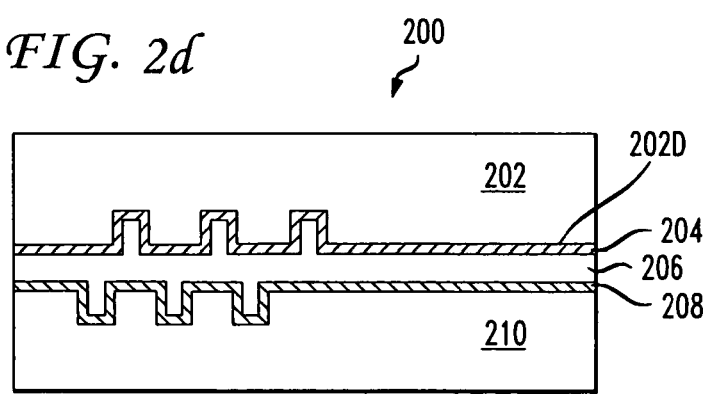

Embodiments of the present principles provide an optical disc having data in at least two different formats (also referred to as a "hybrid" disc), a method of fabricating the disc, a system configured for use in forming the disc, and a computer readable medium with stored program instructions for performing the method.

As will be shown below, a hybrid disc of the present invention includes a first substrate structure bonded to a second substrate structure, with the first and second substrate structures having data in different formats, and respective first and second substrates with different material layer configurations and/or different stacking ring configurations.

In one embodiment, the second substrate structure has a substrate with a first curable material layer on one side of the substrate, and a second curable material layer on the other side of the substrate. Each of the curable materials has a property that results in shrinkage of the respective layer associated with curing of the material. The use of these curable layers on different sides of the substrate allows the curvature of the substrate structure to be controlled.

In one embodiment, the hybrid disc is a double-sided double layer (DS-DL) disc, with two data layers in DVD format being accessible or read from one side of the disc, and two data layers in Blu-ray disc (BD) format being accessible or read from the other side of the disc. As discussed below, one embodiment of the present invention allows conventional equipment (i.e., designed for making standard DVDs) to be adapted for making a DVD substrate structure without a stacking ring (which is a configuration different from that of a standard DVD), which can then be bonded to a BD substrate structure to form a hybrid disc with a reduced total height that conforms to the specifications of the DVD and BD standards.

One or more features of the present principles may be applied to other combinations of disc formats and/or number of data layers. Thus, the disc formats may include at least two formats, e.g., BD25/DVD9, BD25/DVD5, BD50/DVD5, BD50/BD50, BD25/BD25, among others, as well as those available in the future or being developed, e.g., BD200. In addition, one or more sides of the final disc may itself have mixed or hybrid formats on the same side of the disc, including BD, DVD or other applicable formats. In general, each side of the disc may have multiple data layers, and the number of data layers for one side of the disc may be the same as, or different from, the number of data layers for the other side of the disc.

Furthermore, any of the data layers may be a recordable layer (as opposed to all pre-recorded layers in the examples discussed below), and each side may have any combination of pre-recorded and recordable layers, and in one or more data formats.

FIG. 3 is a schematic cross-section showing various material layers of one example of the hybrid optical disc 300. The disc can be formed by bonding together two substrate structures 300-1 and 300-2, each having been separately formed to include respective material and data layers. Table 1 lists the information, e.g., materials, nominal thickness and range, and method of forming the layers, relating to the various layers of FIG. 3. It is understood that, depending on the specific applications or disc formats, other alternatives, e.g., different materials, apply methods and/or layer thicknesses, may also be used. Details regarding the individual layers will be further discussed below.

TABLE 1

| Layer Material | Apply Method | Description | Nominal Thickness; Range (μm) | Process | Layer # |
|---|---|---|---|---|---|
| Polycarbonate | Injection Mold | Molded disc with pit structure for Layer-0 | 570; 550-640 | D1 | 310 |
| Silver alloy | Sputter | Semi-reflective layer | 0.01; 0.005-0.025 | D2 | 312 |
| UV Acrylic Resin | Spin-coat | Spacer Layer (Layer-1 data pits imprinted) | 55; 40-70 | D3 | 314 |
| Aluminum | Sputter | Full-reflective layer | 0.04; 0.02-0.06 | D2 | 316 |
| UV Acrylic Resin | Spin-coat | Protective Layer | 10; 5-15 | H1 | 318 |
| Cationic Adhesive (DVD18) | Screen print | Cationic adhesive | 40; 20-60 | H2 | 320 |
| UV Acrylic Resin | Spin-coat | Tilt-offset Layer | 10; 5-40 | H3 | 322 |
| Metal or dielectric | Sputter | Intermediate Layer | 0.01; 0.005-0.050 | B9 | 326 |
| UV Acrylic Resin | Spin-coat | Tilt-offset Layer | 50; 2-75 | B8 | 324 |
| Polycarbonate | Injection Mold | Molded disc with pit structure for Layer-0 | 500; 450-550 | B1 | 330 |
| Silver alloy | Sputter | Full-reflective layer | 0.04; 0.02-0.06 | B2 | 332 |
| UV Acrylic Resin (a) | Spin-coat | Spacer (base)-layer | 22; 18-28 | B3 | 334 |
| UV Acrylic Resin (b) | Spin-coat | Pit-layer (Layer-1 data pits imprinted) | 3; 2-12 | B4 | 336 |
| Silver alloy | Sputter | Semi-reflective layer | 0.01; 0.005-0.025 | B5 | 338 |
| UV Acrylic Resin (c) | Spin-coat | Cover layer | 72; 65-72 | B6 | 340 |
| UV Acrylic Resin (d) | Spin-coat | Hardcoat/anti-scratch | 3; 3-10 | B7 | 342 |
| | | | Total 1335.1 | | |

In the process column of Table 1, prefix "B" refers to a process performed on a BD fabrication line, and prefix "D" refers to a process on a DVD fabrication line, and H refers to a process on a stripper-bonder (STB), e.g., a STB for DVD-18. The layer column lists reference numerals for the various layers in FIG. 3.

In this example, one substrate structure 300-2 is similar to a DVD-18 "half-disc", e.g., DVD-9, having two data layers (L0 and L1) accessible from one side (in this case, the top side) of the hybrid disc. The other substrate structure 300-1 is similar to a BD-50 "half-disc", with two data layers (L0 and L1) accessible from the other side (bottom side) of the hybrid disc. The terminologies used herein refer to those in the DVD specifications for read-only memory (ROM) published by the DVD Forum, and the Blu-ray disc read-only format published by the Blu-ray Disc Association.

Process steps for forming the hybrid disc can be performed using equipment similar to those designed for making standard DVDs and BDs. Equipment and/or processes of existing manufacturing lines (e.g., SPACELINE II and BLULINE II from Singulus Technologies AG of Germany, among others) can be modified to provide configurations suitable for forming the hybrid discs of the present invention, e.g., hardware components for accommodating the different dimensions of the substrates, as well as process conditions to provide substrate structures according to various physical specifications (that may or may not be the same as in conventional DVD or BD processes or established known standards).

Blu-Ray Disc Substrate Structure

The BD substrate structure 300-1 includes a substrate 330, with the following layers formed on one side 300a of the substrate, from top to bottom in FIG. 3: a reflective layer 332, a spacer layer 334, a pit layer 336 (or data layer), a semi-reflective layer 338, a cover layer 340 and a hardcoat layer 342. In addition, one or more resin layers 322, 324 and intermediate layer 326 may also be formed on the other side 300b of the substrate 330. Except for the reflective layer 332, the semi-reflective layer 338, and layer 326, the other layers in the BD structure are all transparent layers made from non-metallic materials, e.g., polycarbonate, curable polymers such as UV-curing acrylic resin, among others. Depending on the material used, the intermediate layer 326 may have different reflectivity or transmission characteristics. As used herein, a substrate (e.g., substrate 330) and one or more material or data layers associated with that substrate may collectively be referred to as a substrate structure. For example, layers associated with substrate 330 or substrate structure 300-1 include those formed on or contacting the substrate 330 (e.g., layers 324 and 332), as well as others that do not contact the substrate 330 (e.g., layers 334, 322, and so on), but are nonetheless formed "over" the substrate as part of the substrate structure.

Unlike conventional BDs (with a substrate thickness of 1.1 mm), the substrate 330 for this hybrid disc has a thickness of about 500 μm (0.5 mm), or close to the thickness of a DVD. Other embodiments may have a BD substrate thickness of less than about 0.55 mm; or in a range between 0.25 mm to 0.55 mm. In another embodiment, the BD substrate has a thickness between about 0.45 mm to about 0.55 mm. Molded pits, representing a first data layer L0, are formed in the substrate 330 using injection molding and stamping.

Injection molding process B1 can be performed in a molding machine that has been modified (e.g., from a machine used for producing conventional BDs) to produce a substrate that is thinner than 1.1 mm, i.e., thinner than a conventional BD substrate. In one example, the modification may be done by mechanically adjusting the mold components to provide an effective dimension for forming a thinner substrate. This allows a conventional machine designed for standard BD substrates to be configured or retrofitted for this operation in a much shorter timeframe, e.g., resulting in over a 6-fold reduction in the time required, when compared to replacing the entire mold itself.

One or more of the molding process conditions, e.g., temperatures, process time, cooling rate, spin speed, mold pressure, and so on, may be adjusted accordingly to form the thinner BD substrate within desired specifications.

The remaining layers 332, 334, 336, 338, 340 and 342 can be formed in sequence over the substrate 330, e.g., formed over the surface 330a (although these layers are shown in FIG. 3 to be "below" the surface 330a) using known or conventional processes and materials such as those used for forming standard BD-50. Examples of some known processes or production steps for forming standard BDs include those used in the Singulus BLULINE II production system, for example, described in the Singulus brochure, "BLULINE II BD50 Enabling the Blu-ray Future," of 2008, and others discussed in "Smart Solutions to Drive the Future" by Eggo Sichmann, Singulus, May 2005. Both documents are available from the interne, or from Singulus Technologies AG, of Germany. Materials in these documents are herein incorporated by reference in their entirety. In one embodiment, various layers of the BD substrate structure can be formed in different machines and units integrated in a BD production system, e.g., a molding machine, spin-coater, sputtering machine, and so on.

As illustrated in FIG. 3 and Table 1, after a reflective layer 332, two transparent layers 334 and 336 are formed. In this example, these layers are made of different thickness of different types of curable materials, including, for example, radiation or thermal curable polymers or resins, e.g., UV-curable acrylic resins or acrylates. The materials and layer thicknesses are selected to provide suitable or optimal properties (e.g., optical, mechanical, chemical, among others) for respective functions. Layer 334, which is in direct contact with reflective layer 332, should have properties that are compatible with the material (e.g., silver) in reflective layer 332. The pit layer 336 has pits formed thereon, e.g., using a stamper (not shown), representing a second data layer L1. The L1 data pits may be formed by either the 2P process (see FIG. 2) or the wet embossing process previously discussed. For example, layer 334 may be a standard type of resin, while the relatively thin layer 336 is selected for forming the pits in an optimal manner while minimizing shrinkage upon and/or after curing. Other thickness ranges or combinations for these two layers 334, 336 may also be used, e.g., with their total layer thickness being about 25 μm, while keeping layer 336 to be sufficiently thin to avoid excessive shrinkage associated with curing.

This is followed by a semi-reflective layer 338, e.g., silver alloy, a cover layer 340 and a hardcoat layer 342. The L0 and L1 data on the BD structure are read from the bottom side. In one example, the cover layer 340 and the hardcoat layer 342 are two separate layers of different types of resins, with respective thicknesses selected to provide desired or optimal properties, or to conform to certain established standards (e.g., total thickness of 75 μm). Furthermore, the hardcoat layer 342 has a higher modulus, i.e., less elastic, than the cover layer 340. In one example, a material having a modulus of greater than about 1200 MPa (mega pascal) at 25° C. is used for the hardcoat layer 342.

In other embodiments, one or both of the two-layer combinations, i.e., [334, 336] and [340, 342], may be a single layer of one material (instead of two layers of different materials), as long as the material properties and thickness are suitable for the specifications and/or performance requirements. Although UV-curable resins are preferred, other materials with appropriate properties (e.g., different shrinkage factor, modulus, curable by other means such as thermal or other forms of radiation) may also be used. It is preferable that the hardcoat layer 342 be made of a material with a high modulus to provide sufficient rigidity for effective protection.

Figure 4A:
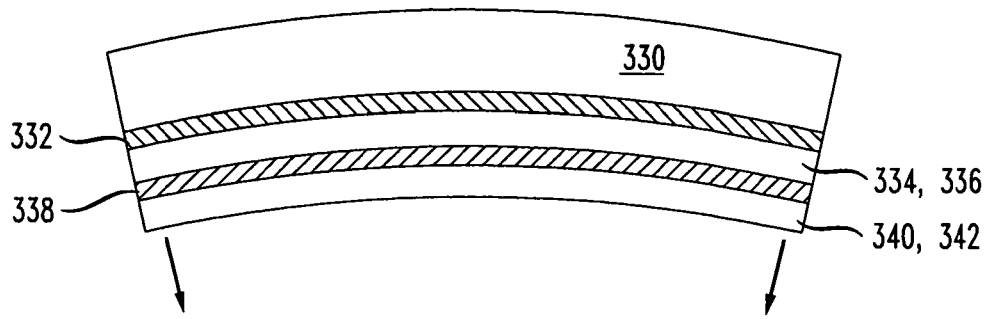
FIG. 4a is a schematic illustration of a tilt in a BD structure during fabrication.

Due to the reduced rigidity of the 0.5 mm polycarbonate disc substrate (compared to a standard 1.1 mm BD substrate), a problem may be encountered after one or more of the UV resin layers (e.g., layers 334, 336, 340 and 342, formed using one or more UV-curable acrylic resins known to one skilled in the art) in the 0.1 mm layer stack are formed in the BD substrate structure. Specifically, since the UV resin materials typically have a shrinkage factor of about 4-8% by volume during and/or after UV curing, the resulting BD structure may exhibit heavy "dishing" or curvature (also referred to as a "tilt" or warping) due to a force arising from the shrinkage associated with the curing of the resin material. This is illustrated in FIG. 4a, which shows the BD substrate 330 and the layers formed thereon having a concave shape when viewed from the bottom/readout side of the hybrid disc, or an umbrella shape when viewed in a side view.

From a manufacturing viewpoint, such significant dishing or curved contour may lead to one or more problems such as inability to perform one or more in-line or in-process tests, including, for example, disc inspection using an inline defect scanner, signal testing, or accurate thickness measurements on one or more of the resin layer(s) during disc fabrication.

In general, the material and thickness of respective curable layers formed over the data side (side 330a) of the BD substrate 330 (i.e., layers 334, 336, 340 and 342), are selected based on various factors such as optical, mechanical and/or chemical properties as determined by the functions and/or processing needs of the layers. For example, a protective or cover layer preferably has a relatively high modulus for effective protective function, while a layer in direct contact with a reflective layer that includes silver should be chemically compatible so as to avoid undesirable reaction. Any curvature resulting from shrinkage associated with the cured material may then be compensated for by using one or more curable layers formed on the other side 330b of the BD substrate 330 to offset the curvature or tilt (thus, the name "tilt-offset" layers) that may arise from material shrinkage. These tilt-offset material layers and corresponding processing steps used to alleviate or counteract the dishing effect are discussed below.

In one embodiment, a layer 324 is applied as a topcoat layer to the other side or surface 330b of the substrate 330 (i.e., opposite to the side 330a where layers 334, 336, 340 and 342 are located). In this case, layer 324 is used to produce a dish-up effect (by virtue of the bending force arising from its shrinkage upon curing) that at least partially compensates for the dish-down effect from the layers on the side 330*a* of the substrate. Since the amount of curvature change depends on the material properties (e.g., the shrinkage factor and the modulus) and the layer thickness, layer 324 can be selected to have a material and thickness combination that results in an amount of curing shrinkage that would at least partially offset the curvature arising from the shrinkage of one or more layers 334, 336, 340 and 342, such that the overall curvature of the substrate structure can be reduced. However, depending on the specific applications, this layer may not be needed in all situations. For example, it may be omitted if the dishing effect or curvature in the substrate structure resulting from resin layers 334, 336, 340 and 342 are within acceptable limits.

The material for this layer 324 (in process B8) may be a material such as a hardcoat layer material as used in process B7, e.g., with a modulus of at least 1200 MPa. In general, one or more of layers 334, 336, 340, 342 and 324 may be made of standard materials used in known processes, or they may be proprietary materials with properties suitable for the specific functions of the respective layers. In one example, about 50 µm of a UV-curable resin is applied to the surface 330*b* of substrate 330 using spin-coating on a BD line equipment. The material type, layer thickness and/or process conditions are selected to provide the final, cured layer 324 with a desired magnitude of shrinkage or dishing effect. One or more process conditions, e.g., temperature, spin-coating speed, and so on, are adjusted accordingly.

Figure 4B:
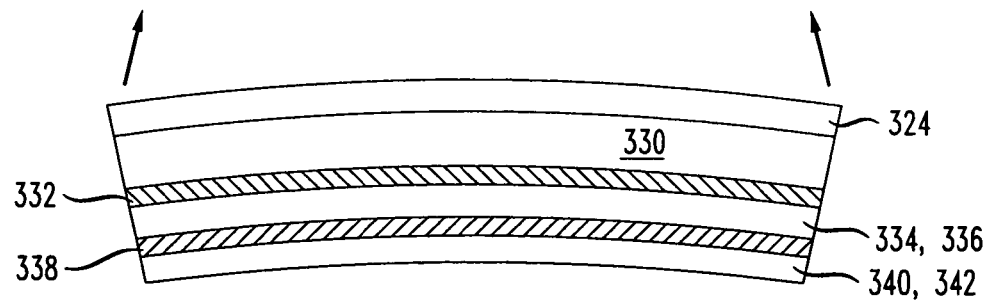
FIG. 4b is a schematic illustration of the BD structure having a tilt-offset layer.

FIG. 4*b* illustrates the shrinkage of the layer 324 providing a counter-balance, e.g., a force due to shrinkage that results in a dish-up effect, which at least partially offsets the dish-down effect from one or more of the resin layers 334, 336, 340 and 342, resulting in a substrate structure with reduced dishing or curvature compared to the structure of FIG. 4*a*. Appropriate choice of a combination of material, thickness and/or process condition can result in a BD substrate structure having improved flatness specification, e.g., sufficient to allow substrate inspection to be performed using standard equipment during fabrication.

In other embodiments, additional layers such as layers 322 and 326 may also be provided as a part of the BD substrate structure 300-1, e.g., layer 322 may be another tilt-offset layer for fine-tuning the tilt or curvature of the BD substrate structure. These layers will be discussed in a later section.

DVD Substrate Structure

As shown in FIG. 3, the DVD substrate structure 300-2 includes the following layers, starting from the top: a substrate 310, semi-reflective layer 312, spacer layer 314, reflective layer 316 and a protective layer 318. The substrate 310 has molded pits formed thereon, representing a first data layer L0, and the spacer layer 312 has molded pits formed thereon, representing a second data layer L1. Except for the semi-reflective layer 312 and the reflective layer 316, other layers of the DVD structure are transparent layers made from non-metallic materials, e.g., polycarbonate, acrylic resins, among others. In one example, layers 310, 312, 314 and 316 are formed in different machines (e.g., molding machine, sputtering machine and spin-coater) that are integrated in a DVD production system, and the protective layer 318 can be formed by spin-coating in a stripper-bonder that is separate from the DVD production system.

Although most of the materials and processes for forming this DVD structure are similar to those used for forming a standard DVD disc, e.g., DVD-9, various modifications to the process and/or materials can also be implemented to provide a final hybrid disc that conforms to other physical specifications, in addition to established or currently known standards. Again, examples of various layer thicknesses and ranges, as well as description of materials and application methods, are provided in Table 1.

In general, the transparent substrate 310 has a thickness less than about 0.65 mm. In one embodiment, the thickness is at least 0.55 mm, and in another embodiment, between about 0.56 mm and 0.64 mm.

In conventional fabrication process, the substrate 310 is provided or maintained within certain flatness specifications during manufacturing. However, according to one embodiment of the present invention, the molding process of DVD substrate 310 may be designed to provide a dishing effect or curvature that at least partially compensates for that of the BD substrate structure previously discussed, such that, when the DVD and BD structures are bonded, a hybrid disc with improved or optimum flatness (e.g., within desired specifications) can be produced. The DVD substrate molding may be achieved by adjusting one or more molding conditions (e.g., temperature, cooling time or rate, injection pressure, and so on) to produce a DVD substrate tilt to substantially compensate for the tilt of the BD substrate structure (i.e., including the topcoat layer 324). The resulting DVD substrate 310 will have an oppositely dished shape compared to that of the BD substrate structure (or a curvature that is opposite to the curvature of the BD structure, when both are viewed from the same side or direction). Such a substrate 310 with its associated layers 312, 314, 316 and 318 are illustrated in the top part of FIG. 4*c*. In some situations, it may also be desirable to maintain the molded DVD substrate below a tilt limit in order to provide sufficient process control for other subsequent processing steps, e.g., in forming a spacer layer.

Figure 4C:
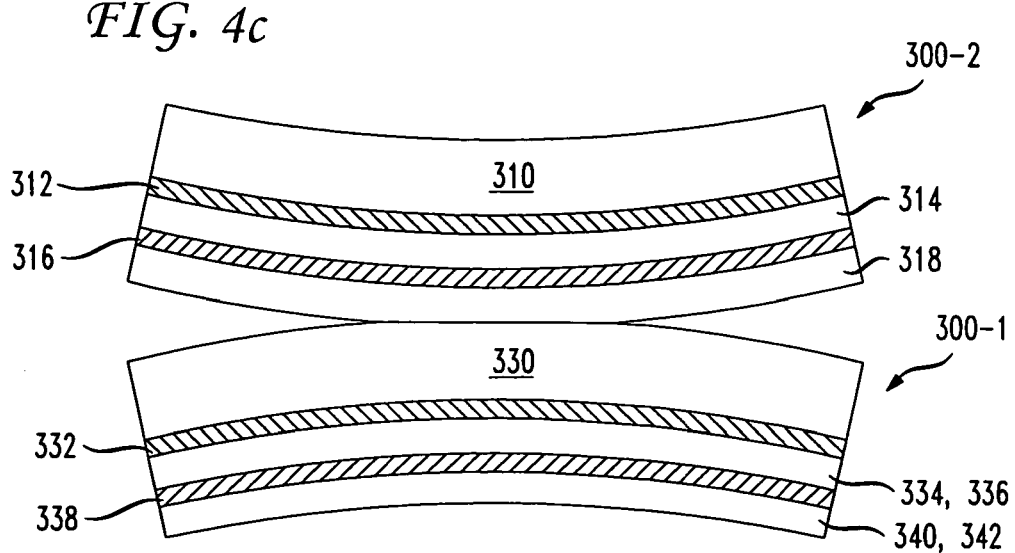
FIG. 4c is a schematic illustration of a DVD substrate having a tilt opposite to that of the BD structure.

In one example, the DVD substrate can be molded to provide a shape with equal curvature or contours as the concave shape of the BD substrate structure, except that the DVD substrate will be convex when viewed from the bottom side (or the BD readout side) of the final hybrid disc. Depending on the specific processing needs or disc applications, however, other embodiments can provide a molded DVD substrate having a curvature or contour that is not equal (but still having an oppositely dished shape) to that of the BD substrate structure. A subsequent bonding process, which can be performed in a stripper-bonder (to be described below), will bring the DVD substrate structure 300-2 and the BD substrate structure 300-1 together, with their centers contacting each other, as shown in FIG. 4*c*. In this example, the BD structure 300-1 is shown without the tilt-offset layers 322, 324 and the intermediate layer 326.

Bonding of DVD Substrate Structure to BD Substrate Structure

Referring back to FIG. 3 and Table 1, the DVD substrate structure 300-2 and the BD substrate structure 300-1 are bonded to each other by an adhesive layer 320 to form the hybrid disc. In one embodiment, the adhesive layer 320 is an adhesive such as that used in fabricating standard DVD-18, e.g., a UV-curable cationic adhesive, or a UV-curable pressure sensitive adhesive. The adhesive may be applied by screen printing, or another suitable technique, on a hybrid stripper-bonder, or similar units.

As previously mentioned, one or more additional layers, e.g., layers 322 and 326, can also be formed as part of the BD substrate structure 300-1 prior to bonding to the DVD structure 300-2. For example, layer 322 may be another tilt-offset layer to provide fine-tuning to compensate for any residual tilt (i.e., any tilt that may remain from the varying layers on the BD substrate structure and/or the molding of the DVD substrate) so that the resulting hybrid disc (i.e., after bonding the DVD and BD substrate structures together), will have a predetermined flatness within certain specifications, e.g., to conform with established standards or other application needs. Fine tuning of the tilt-offset can be achieved by selecting a combination of the material properties (e.g., shrinkage factor, modulus) and thickness of the layer.

In the example of FIG. 3 and Table 1, a layer 322 made of an UV-curable resin material, is applied to the BD substrate structure in process H3 (e.g., either directly to the top side 330b of the BD substrate 330, or to the resin layer 324), prior to bonding to the DVD substrate structure in the stripper bonder. The resin layer 322, which may be applied by spin-coating in the stripper bonder, can be used to provide additional dishing offset that may be needed in order to obtain a hybrid disc with a final flatness that is within certain desired specifications or standards. The material used in layer 322 may be the same or different from that of layer 324. For example, a material having a modulus of at least 1200 MPa can be used.

Aside from UV curable acrylic resins, other transparent materials (i.e., transparent to wavelengths for writing or reading the corresponding data layers) with suitable properties may also be used. In one example, the radial tilt on the DVD side is within a limit of ±0.8 degree, and that on the BD side is ±0.7 degree.

In yet another example, prior to forming the layer 322 in the BD substrate structure, a metal or dielectric layer 326 is applied over the resin layer 324. As shown in Table 1, this process B9 can be done in a sputtering machine, in which a thin coating having a thickness between about 5 to 50 nm (0.005-0.050 μm) is formed on the layer 324. The optimum thickness also depends on the specific material. Different materials may be used for layer 326, including, for example, a metal such as aluminum or silicon, a dielectric, or silicon nitride. In one example, a layer of silicon nitride having a thickness in a range of 5-10 nm is used. One advantage of providing an intermediate layer 326 is that, in situations where the adhesion or coverage of layer 322 directly over layer 324 poses a problem, layer 326 can be used to improve the coverage uniformity, e.g., by managing surface tension compatibility, or providing better surface tension matching, between adjacent layers. In addition, the intermediate layer 326 also facilitates disc handling during processing.

After bonding the two substrate structures to form the hybrid disc, a label can be printed on the DVD side (e.g., a relatively narrow band around the inner diameter so as not to interfere with the readout or normal operation of the DVD) such that the BD side faces down and the hybrid disc is used for "label-up" player insertion.

Disc Structure

Thus, the present invention provides a data disc that includes a first substrate structure bonded to a second substrate structure, with the first substrate structure having at least one data layer in a first format that is different from a second format of a data layer in the second substrate structure, and one or more specific features such as those discussed above being provided in the data disc.

In another embodiment, a hybrid disc is formed by bonding a first substrate structure to a second substrate structure, in which, before bonding, the first substrate structure has a first curvature (or tilt) that is opposite, and preferably, substantially equal, to a second curvature (or tilt) produced by the second substrate structure. The curvature or tilt may be produced by applying one or more UV-curable resin layers on one side of a substrate structure, or by molding a substrate.

Another embodiment of the present invention also provides a substrate structure in which at least a first curable material layer is formed on one side of a substrate associated with the substrate structure, at least a second curable material layer is formed on the other side of the substrate, and each curable material has a property that results in shrinkage of the material layer upon curing (i.e., shrinkage may occur during and/or after curing). Due to the layer shrinkage, the first curable material layer would produce a first curvature (or tilt) in the substrate structure, and the second curable material layer would produce a second curvature (or tilt) in the substrate structure that is opposite to the first curvature, such that the resulting substrate structure has a final curvature with a magnitude that is less than either the first or the second curvature.

One embodiment includes a first substrate structure having a substrate with a thickness less than about 0.65 mm, and the second substrate structure having a second substrate with a thickness less than about 0.55 mm. In other embodiments, the total height of the hybrid disc may have a range of about 1.2-1.4 mm (including stacking rings).

While the discussions thus far focus on various material layers in the substrate structures, another aspect of the present invention relates to the formation of a disc substrate having different stacking ring configurations. A stacking ring, which is an annular protruded portion around an inner perimeter or diameter of an optical disc, is designed to avoid possible damage to the read surface of a disc by providing a gap between adjacent discs that are stacked together. As will be shown below, an embodiment where a stacking ring is absent on the top surface of the disc can better facilitate label printing because of a fully flat surface, and may also be a good option for providing a reduced total disc height in situations where there is a strict constraint relating to the disc height. For the purpose of this discussion, the stacking ring configurations are illustrated below in connection with a hybrid disc formed by bonding a DVD substrate to a BD substrate. However, the alternative stacking ring configuration and the corresponding process can generally be used in other applications or disc formats (including single format discs), and can be used alone or in combination with one or more features or embodiments of the hybrid disc discussed herein.

As mentioned, a DVD substrate in one embodiment of the present invention may be formed as in standard or conventional DVD-9 discs. In the standard DVD molding process, the mold for forming the L0 substrate (i.e., the substrate associated with the first data layer L0) has a recess for forming the stacking ring on the non-data side of the DVD molded substrate. A standard BD molding process also provides a similar stacking ring on the BD substrate. Thus, a hybrid disc formed by bonding the two substrate structures with their respective stacking ring will have two stacking rings.

Figure 5:
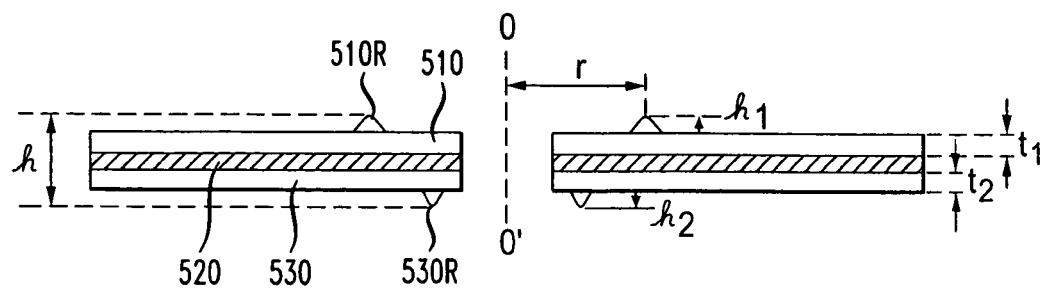
FIG. 5 is a cross-sectional illustration of a disc with two stacking rings.

This is illustrated in FIG. 5, which shows a hybrid disc of the present invention with two stacking rings 510R and 530R. In this example, the disc includes a first substrate structure 510 bonded to a second substrate structure 530 by a bonding or adhesive layer 520. The stacking ring 510R is formed on a first substrate of substrate structure 510, and stacking ring 530R is formed on a second substrate of substrate structure 530. For clarity, other layers and substrates in the respective substrate structures (similar to those supported by substrates 310 and 330 shown in FIG. 3) are omitted from FIG. 5.

The formation of the substrate structure such as structure 510 with its stacking ring and other material layers is further discussed with reference to FIG. 6a-d, which show cross-sectional views of various layers during different stages of forming a dual-layer disc, e.g., DVD. Only one half of the structure (e.g., corresponding to the left half of FIG. 5) is shown in FIG. 6a-d. Such a process sequence is also suitable for forming the DVD substrate 310 for use in one embodiment of the hybrid disc of the present invention.

Figure 6A:
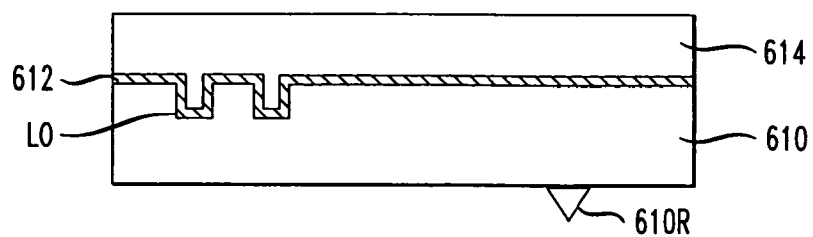
FIGS. 6a-d are cross-sectional views to illustrate a process sequence for forming a dual-layer substrate structure with a stacking ring.

FIG. 6a shows a DVD L0 substrate 610 formed by a L0 mold (i.e., the mold for forming the substrate associated with the first data layer L0) such that a stacking ring 610R is formed on the non-data side of the DVD L0 substrate 610. A stamper (not shown) is used to form pits (corresponding to L0 data) on the data side of the L0 substrate 610. After a semi-reflective layer 612, e.g., metal, is formed over the data surface of the L0 substrate 610, a spacer layer 614 is applied over the metal layer 612.

Figure 6B:
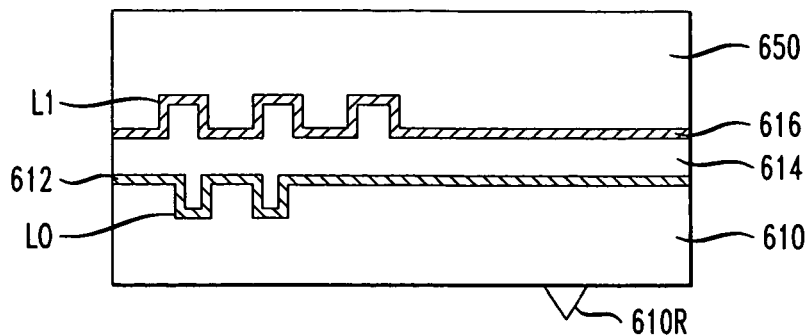

FIG. 6b shows a DVD L1 substrate 650, i.e., a substrate with a second data layer L1 pattern (formed in a molding machine with a L1 mold and a data stamper) having a metalized layer 616, e.g., aluminum, being used as a stamper to transfer the L1 data pattern to the spacer layer 614.

Figure 6C:
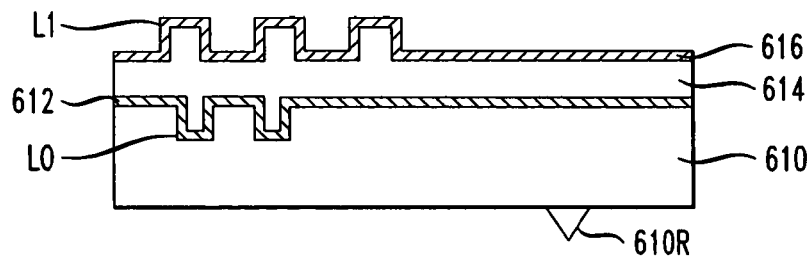
Figure 6D:
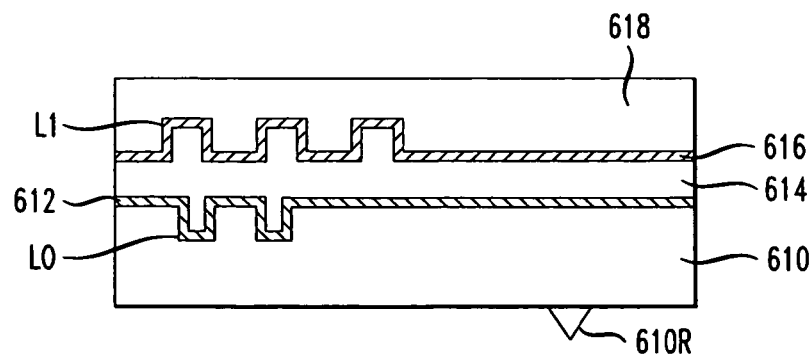

After this, the DVD L1 substrate 650 is removed (e.g., discarded, and does not form a part of the final DVD structure), leaving a substrate structure having two data layers L0 and L1, with the stacking ring 610R at the bottom of the L0 substrate 610, as shown in FIG. 6c. A protective layer 618 is then formed over the metalized L1 layer 616, after which, the DVD structure of FIG. 6d may be bonded to a BD structure to form a hybrid disc such as that shown in FIG. 5.

In FIG. 5, the stacking ring 510R (e.g., corresponding to ring 610R in FIG. 6) is formed on the non-data side of the DVD substrate, and the other stacking ring 530R is formed on the bottom side (or read side) of the BD substrate. These rings are formed at different locations around the inner perimeter of the hybrid disc, e.g., outside of the data area. In one embodiment, stacking ring 510R is located at a radial distance (r) of about 17.65 mm and ring 530R is located at a radial distance of about 9.735 mm (the radial distance being measured from the center vertical axis OO' of the disc).

In one example, each substrate structure has a thickness ($t_1$, $t_2$) of about 0.6 mm, stacking ring 510R has a height ($h_1$) of about 0.22 mm, and stacking ring 530R has a height ($h_2$) of about 0.12 mm (the height being measured from the plane of the corresponding substrate). After bonding, the resulting hybrid disc has a total height (h), including other layers, of about 1.62 mm, which is outside of the maximum disc height/thickness specified by the BD and DVD disc standards (e.g., System Description Blu-ray Disc Read-Only Format by BDA, and the DVD specifications for ROM by the DVD Forum).

Figure 7:
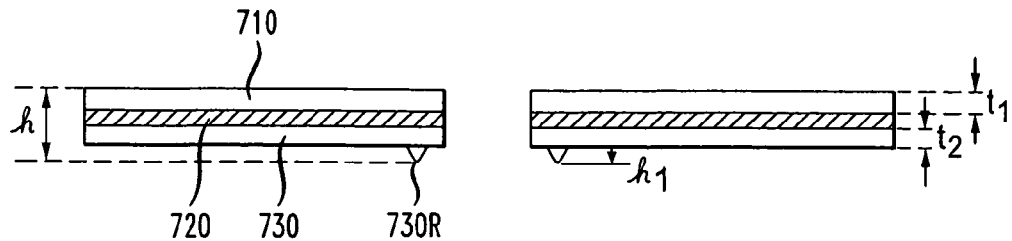
FIG. 7 is a cross-sectional illustration of a disc with one stacking ring.

Another embodiment of the present invention provides a different molding process for forming one of the disc substrate structures, e.g., the DVD substrate, using existing commercially available equipment (or those in standard manufacturing lines) such that the DVD substrate is formed without a stacking ring. The resulting hybrid disc of this embodiment will only have one stacking ring on the BD substrate (in this case, the thinner substrate in the disc), as shown in FIG. 7, which shows a first substrate structure 710 being bonded to a second substrate structure via a bonding layer 720. For clarity, the individual layers in the respective substrate structures 710 and 730 are omitted. In this example, the first substrate structure 710 is a DVD structure with a thickness ($t_1$) of 0.6 mm, and the second substrate structure is a BD substrate structure with a thickness ($t_2$) of 0.6 mm and a BD stacking ring with a height ($h_1$) of 0.12 mm. This results in a hybrid disc with a final height (h) of about 1.40 mm, which is within the existing DVD and BD disc standards.

For example, such a hybrid disc with only a single stacking ring can be produced by using existing DVD production equipment, by interchanging the L0 and L1 molds used for molding the DVD L0 and L1 substrates for standard DVD production. That is, according to a method of the present invention, in forming the DVD substrate structure of the hybrid disc, a mold typically used for forming the L0 DVD substrate (referred to as the "L0" mold, with a recess for forming the stacking ring) is used for molding the L1 DVD substrate, and a mold typically used for the DVD L1 substrate (referred to as the "L1" mold, without any recess for forming a stacking ring) is used for molding the DVD L0 substrate.

The stamping of the L0 data and L1 data are still using the respective L0 and L1 stampers, as in the process of FIGS. 6a-d. However, by exchanging the L0 and L1 molds in the respective molding machines (i.e., in systems where separate machines are used for molding the L0 and L1 substrates), the stacking ring can be formed on the L1 substrate, instead of on the L0 substrate. This can be better understood by referring to the cross-sectional views of FIG. 8a-c (unlike FIG. 7, only half of the disc cross-section is shown).

Figure 8A:
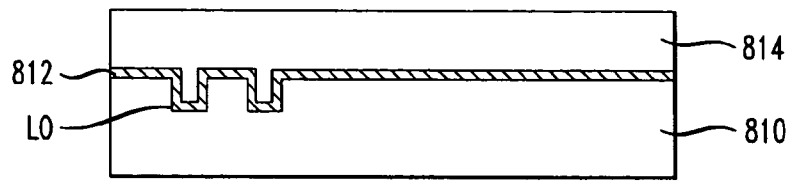
FIGS. 8a-d are cross-sectional views to illustrate a process sequence for forming a dual-layer substrate structure without a stacking ring.

FIG. 8a shows a DVD L0 substrate 810 with data formed on its data side (e.g., by injection molding and stamping), but without a stacking ring. This is followed by a semi-reflective layer 812 (e.g., metal, or silicon, . . . , etc.) and a spacer layer 814.

Figures 1, 8B:
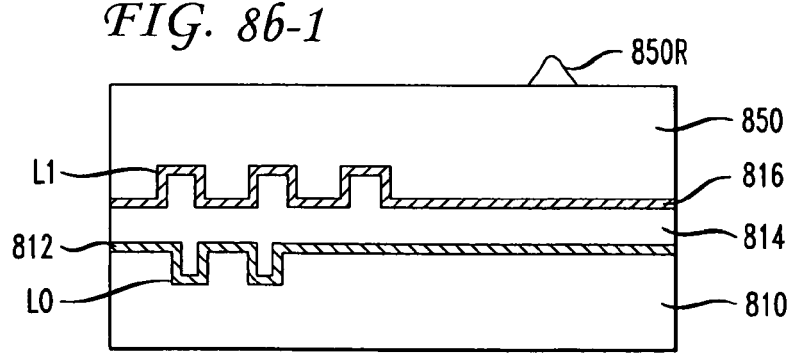

FIG. 8b-1 shows a DVD L1 substrate 850 molded with a stacking ring 850R (from the L0 mold) and a metal layer 816, e.g., aluminum, being used as a stamper to transfer the L1 data to the DVD spacer layer 814 (the DVD L1 substrate is stamped with the L1 data pattern prior to its being metalized). The L1 substrate 850 is then removed, e.g., in a stripper-bonder.

In one embodiment, the L1 substrate 850 is made of PMMA (polymethyl methacrylate), instead of polycarbonate. The use of PMMA facilitates the stripping and removal of the L1 substrate 850 from the metal layer 816 (because aluminum has poor adhesion to PMMA), thus leaving the transferred L1 data pattern and reflective layer 816 intact, as shown in FIG. 8c.

Figures 2, 8B:
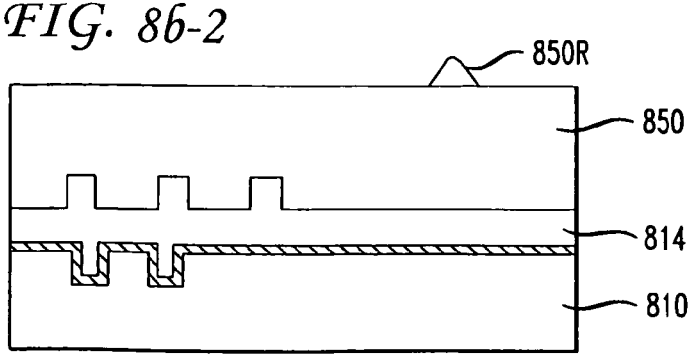

In another embodiment, polycarbonate (PC) is used for the L1 substrate 850 along with a spacer layer resin 814 that has poor adhesion to PC. This is shown in FIG. 8b-2, in which the un-metalized L1 substrate 850 is used as a stamper to transfer the L1 data pattern to the spacer layer 814. After stripping the polycarbonate L1 substrate 850 from the spacer layer 814, a reflective layer 816 (e.g., metal) is formed over the spacer layer 814, resulting in the structure of FIG. 8c.

Figure 8C:
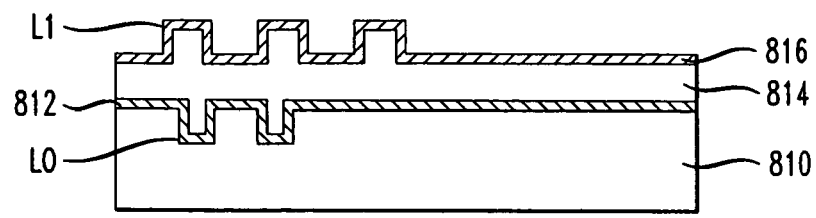
Figure 8D:
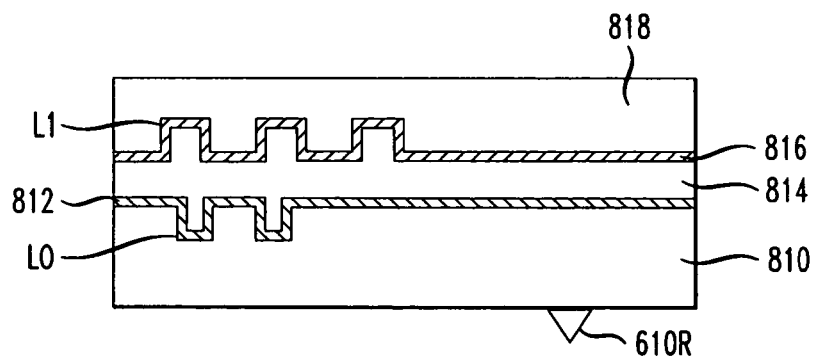

A protective layer is then formed over the reflective layer, as shown in FIG. 8c. This DVD substrate structure, which does not have any stacking ring, can then be bonded to a BD substrate structure to form a hybrid disc, such as that shown in FIG. 7. This configuration of a hybrid disc without a stacking ring on the top substrate (DVD in this case) also facilitates the printing of a label for the hybrid disc, e.g., a 2-3 mm radius band around the inner diameter of the disc.

Thus, by exchanging the L0 and L1 molds in the molding machines for the DVD substrates, existing manufacturing equipment for standard DVD production can be used to produce DVD substrate structures suitable for forming the hybrid discs of the present invention, with final disc heights (including stacking ring) being within the specified DVD and BD standards.

Hybrid Disc Fabrication Process

Another aspect of the present principles provides a method of forming a disc having at least two data formats, which includes forming a first substrate structure with at least a first data layer in a first data format, forming a second substrate structure with at least a second data layer in a second data format different from the first format, and bonding the first substrate structure to the second substrate structure. The first data layer or additional layers associated with the first substrate structure are read or accessed from a first side of the hybrid disc, and the second data layer or additional layers associated with the second substrate are read or accessed from the second side of the hybrid disc.

One example of the hybrid disc is a double-sided double-layer disc with DVD format and BD format, respectively, e.g., with one disc substrate structure corresponding to a DVD-9, and the other disc substrate structure corresponding to a BD-50. Other embodiments of the method further include one or more steps for forming the materials layers such as those discussed above in connection with FIG. 3 and Table 1 in the substrate structures. In one embodiment, the method involves forming at least two layers of curable materials, one on each side of a second substrate in the second substrate structure. Each curable material (the two curable materials may be the same or different) has a property that results in a certain amount of shrinkage after curing, which, in turn, may result in a tilt or curvature in the substrate structure. The amount of shrinkage generally depends on the specific material property and the layer thickness. By providing one or more curable material layers on opposite sides of the second substrate, the curvature of the second substrate structure can be controlled, e.g., by a combination of the material and thickness. Thus, by selecting the material property and/or thickness of the second curable material layer, the overall curvature of the substrate structure can be reduced, to conform with desired specification or standard, or sufficiently flat to allow in-line testing to be performed.

In another embodiment, the double-sided hybrid disc has only one stacking ring or an annular protruded portion, which is formed by injection molding on a thinner one of the two substrates. In the case of the hybrid disc having a first substrate structure being a DVD structure and a second substrate structure being a BD structure, the disc can be manufactured to conform to the DVD and BD standards by using conventional DVD and BD equipment. Specifically, by interchanging the two molds in a conventional DVD manufacturing tool, i.e., using the mold for a L0 substrate in forming the L1 substrate and vice versa, the DVD substrate structure can be formed without a stacking ring, as previously discussed in connection with FIG. 8. When such a DVD substrate structure is bonded to a BD substrate structure to form a hybrid disc, only a single stacking ring is present on the BD substrate structure, which allows the resulting hybrid disc to have a total thickness that complies with the DVD and BD formats. By interchanging the L0 and L1 molds in forming the DVD substrate structure, conventional DVD manufacturing equipment can readily be integrated into a system for making hybrid discs, e.g., DVD-BD hybrid discs.

System for Forming the Disc

Thus, another aspect of the present invention provides a system suitable for use in forming a hybrid disc of the present principles. Specifically, the system includes a first sub-system configured for use in forming a first disc substrate structure having a first disc format, a second sub-system configured for use in forming a second disc substrate structure having a second disc format that is different from the first disc format, and a third sub-system configured for bonding the first disc substrate structure to the second disc substrate structure. In one embodiment, the first disc format is a DVD format, and the second disc format is a BD format, and the data disc is formed with only one stacking ring in the second substrate structure, i.e., no stacking ring or annular protruded portion in the first substrate structure. The first and second sub-system each includes at least a molding machine, a spin-coater, a sputtering chamber, and an imprinting unit (e.g. a stamper or wet embossing unit) for performing one or more processes described above in connection with fabricating the hybrid disc. The third sub-system includes one or more units for applying resin or adhesive onto a substrate structure (e.g., a spin coater), curing materials, bonding substrate structures, and stripping or removing a stamper after an imprinting step. For example, the third sub-system can be a stripper-bonder, which includes a spin coater for applying a resin material to a substrate structure, and a ultra-violet radiation source for curing the resin.

Furthermore, the system has at least one processor and associated computer readable medium (e.g., hard drive, removable storage, read-only memory, random accessible memory, and so on). Program instructions are stored in the computer readable medium such that, when executed by the processor, will cause a method to be implemented according to one or more embodiments for forming a data disc of the present invention.

Although the above examples focused on a hybrid double-sided double-layer disc having DVD and BD formats, one or more features of the present principles may be adapted or implemented, separately or in various combinations with each other, to form other data discs with different format combinations and different number of data layers, including more than two data layers associated with each substrate structure. For example, aside from pre-recorded data layers, one or more of the data layers can be a recordable data layer, which can be formed by using a suitable recordable material, such as inorganic or organic materials known to one skilled in the art, including phase change materials or dyes. Thus, the disk of the present invention also includes pre-recorded formats such as DVD-ROM and BD-ROM, as well as different recordable formats such as write-once and rewritable formats. In addition, one or more of the two substrate structures can also have at least two data layers with different formats (i.e., not all the data layers associated with one substrate structure need to be the same format).

Furthermore, although it is desirable to provide hybrid discs or disc substrate structures conforming to one or more established or known standards, the present principles may also be used to form other discs with specifications that are different from known standards.

While the forgoing is directed to various embodiments of the present invention, other and further embodiments of the invention may be devised without departing from the basic scope thereof. As such, the appropriate scope of the invention is to be determined according to the claims, which follow.

The invention claimed is:

1. A data disc, comprising:
    a first substrate structure bonded to a second substrate structure, the first substrate structure having a first substrate and at least a first data layer for access from a first side of the disc, the second substrate structure having a second substrate and at least a second data layer for access from a second side of the disc, wherein the first and second data layers have different data formats; and the second substrate structure further comprising a first curable material layer disposed over a first side of the second substrate, and a second curable material layer disposed over a second side of the second substrate; wherein the first and second curable materials each has a property that results in shrinkage associated with curing of the material.

2. The data disc of claim 1, wherein the first and second curable materials are ultra-violet curable acrylic resins.

3. The data disc of claim 1, further comprising at least a third curable material layer over the second curable material layer, the third curable material having a property that results in shrinkage associated with curing of the material.

4. The data disc of claim 3, further comprising a layer of material selected from one of a metal and dielectric between the second and the third curable material layers.

5. The data disc of claim 1, wherein the second substrate is thinner than the first substrate.

6. The data disc of claim 5, wherein the first substrate has a thickness less than about 0.65 mm, and the second substrate has a thickness less than about 0.55 mm.

7. The data disc of claim 1, further comprising a third data layer associated with the first substrate and a fourth data layer associated with the second substrate.

8. The data disc of claim 7, wherein at least one of the first substrate structure and the second substrate structure has at least two data layers with different formats.

9. The data disc of claim 7, wherein at least one of the first data layer, the second data layer, the third data layer and the fourth data layer is a recordable data layer.

10. The data disc of claim 1, having only one annular protruded portion.

11. The data disc of claim 1, wherein the first format is digital versatile disc (DVD) and the second format is Blu-ray disc (BD).

12. The data disc of claim 1, having at least one of a total height and flatness that conforms to specification standards for DVD-read only memory (DVD-ROM) and BD-ROM discs.

13. A method for forming a data disc, comprising:
forming a first substrate structure having at least a first data layer for access from a first side of the disc;
forming a second substrate structure having at least a second data layer for access from a second side of the disc, wherein the first data layer and the second data layer have different data formats;
depositing at least a first curable material layer over a first side of a second substrate of the second substrate structure and curing the deposited first material; and
depositing at least a second curable material layer over a second side of the second substrate and curing the deposited second material;
wherein the first curable material has a property that results in a first amount of shrinkage associated with curing of the material, and the second curable material has a property that results in a second amount of shrinkage associated with curing of the material; and
bonding the first substrate structure to the second substrate structure.

14. The method of claim 13, further comprising:
providing a thickness and material for the second curable material layer such that a curvature of the second substrate structure associated with the second amount of shrinkage is substantially equal to a curvature of the second substrate structure associated with the first amount of shrinkage.

15. The method of claim 13, further comprising:
forming at least a third layer of curable material over the second curable material layer, the third layer of curable material having a property that results in shrinkage associated with curing of the material.

16. The method of claim 13, further comprising:
forming a layer of material selected from one of a metal and dielectric between the second and the third curable material layers.

17. The method of claim 13, further comprising, prior to bonding:
molding the first substrate to provide a first curvature; and
forming the second substrate structure with a second curvature, the second curvature including curvature contributions from at least the first and second amounts of shrinkage;
wherein the first curvature and the second curvature are opposite in directions.

18. The method of claim 13, further comprising:
forming the first substrate structure and the second substrate structure by selecting a combination of materials and thicknesses to produce the disc with at least one of a total thickness and flatness conforming to specification standards for DVD-read only memory (DVD-ROM) and BD-ROM discs.

19. A data disc, comprising:
a first substrate structure bonded to a second substrate structure;
the first substrate structure having a first substrate and at least a first data layer in a first format for access from a first side of the disc;
the second substrate structure having a second substrate and at least a second data layer in a second format for access from a second side of the disc, the second format being different from the first data format;
wherein the disc has a single annular protruded portion formed on a thinner one of the first and second substrates.

20. The data disc of claim 19, wherein the first substrate has a thickness between about 0.55 mm and about 0.64 mm, and the second substrate has a thickness between about 0.45 mm and about 0.55 mm.

21. The data disc of claim 19, wherein at least one of the first substrate structure and the second substrate structure includes a recordable data layer.

22. The data disc of claim 19, further comprising:
a first material layer disposed over a first side of the second substrate;
a second material layer disposed over a second side of the second substrate;
wherein the first material layer and the second material layer each includes a curable material having a property that results in shrinkage associated with curing of the material.

23. The data disc of claim 19, wherein at least one of the first substrate structure and the second substrate structure has two data layers with different data formats.

24. A method of forming a data disc, comprising:
providing a first substrate structure having a first substrate and at least a first data layer in a first format for access from a first side of the disc;
providing a second substrate structure having a second substrate thinner than the first substrate and at least a second data layer in a second format for access from a second side of the disc, the second format being different from the first format; and
bonding the first substrate structure to the second substrate structure;

wherein a single annular protruded portion is provided on the disc, and is formed by injection molding of the second substrate.

25. The method of claim 24, wherein the first substrate structure is formed by:
molding the first data layer into the first substrate;
molding a data pattern on a first side of a third substrate and another annular protruded portion on a second side of the third substrate;
forming a spacer layer on the first substrate;
forming a third data layer on the spacer layer by using the third substrate as a stamper for transferring the data pattern to the spacer layer; and
removing the third substrate from the spacer layer.

26. The method of claim 24, further comprising:
depositing at least a layer of a first curable material over a first side of the second substrate and curing the deposited first material; and
depositing at least a layer of a second curable material over a second side of the second substrate and curing the deposited second material;
wherein the first curable material and the second curable material each has a property that results in shrinkage associated with curing of the material.

27. The method of claim 24, further comprising:
forming the first substrate structure and the second substrate structure by selecting a combination of materials and thicknesses to produce the disc with at least one of a total thickness and flatness conforming to a specification standard for a hybrid disc with digital versatile disc (DVD) and Blu-ray disc (BD) formats.

28. A system for use in forming a data disc, comprising:
a first sub-system configured for forming a first substrate structure having a first substrate and at least a first data layer having a first data format for access from a first side of the disc, the first sub-system being configured for forming the first substrate structure without any annular protruded portion;
a second sub-system configured for forming a second substrate structure having a second substrate and at least a second data layer having a second data format for access from a second side of the disc, wherein the second data format is different from the first data format; the second sub-system being configured for forming an annular protruded portion by injection molding of the second substrate; and
a third sub-system configured for bonding the first substrate structure to the second substrate structure to form the data disc.

29. The system of claim 28, wherein the first sub-system is configured for forming the first substrate structure by performing the steps of:
molding the first data layer onto the first substrate;
molding a data pattern on a first side of a third substrate and an annular protruded portion on a second side of the third substrate;
forming a spacer layer on the first substrate;
forming a third data layer on the spacer layer by using the third substrate as a stamper for transferring the data pattern to the spacer layer; and
removing the third substrate from the spacer layer, the third substrate not forming a part of the data disc.

30. The system of claim 29, wherein the first sub-system includes:
a first molding machine with a first mold for molding the first data layer on the first substrate without forming an annular protruded portion on the first substrate;
a second molding machine with a second mold for molding the annular protruded portion on the third substrate;
wherein the first sub-system is further configurable for use in producing a dual-layer digital versatile disc (DVD) by using the second mold in the first molding machine for forming a first data layer and an annular protruded portion of the double-layer DVD, and using the first mold in the second molding machine for forming a second data layer of the dual-layer DVD.

31. The system of claim 28, wherein the first sub-system is configured for forming a digital versatile disc (DVD) substrate structure and the second sub-system is configured for forming a Blu-ray disc (BD) substrate structure.

* * * * *